Oct. 8, 1968   D. B. LOMBARD ET AL   3,404,559
TRANSDUCER FOR MEASURING PRESSURE PULSES
Filed March 8, 1965
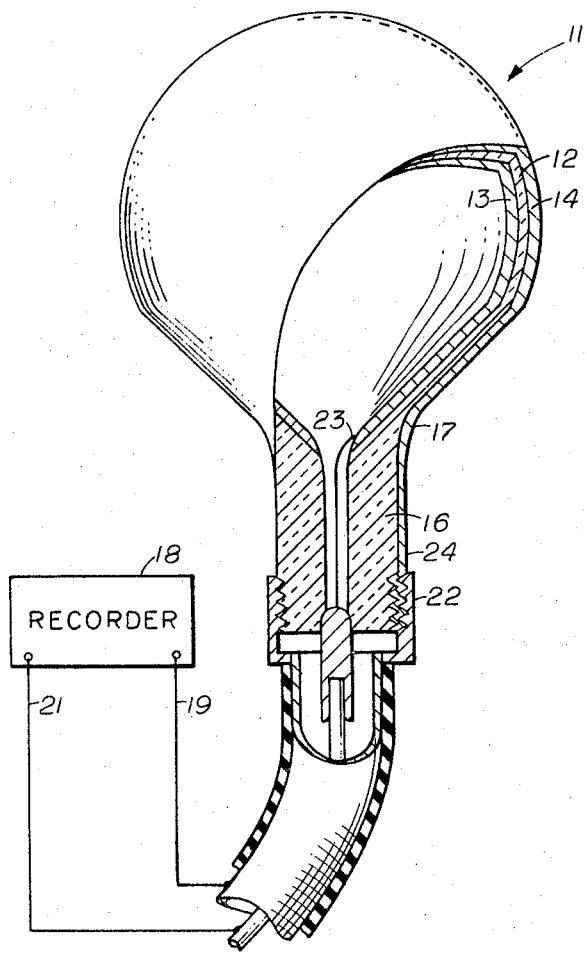
INVENTORS
DAVID B. LOMBARD
DEAN V. POWER
BY
ATTORNEY ID
3,404,559
TRANSDUCER FOR MEASURING PRESSURE PULSES
David B. Lombard, and Dean V. Power, Livermore, Calif., assignors to the United States of America as represented by the United States Atomic Energy Commission
Filed Mar. 8, 1965, Ser. No. 438,137
6 Claims. (Cl. 73—35)

ABSTRACT OF THE DISCLOSURE

Transducer apparatus having a convex dielectric surface nested between and insulating two conductors across which a potential is developed by shock waves impinging on the dielectric surface.

---

The invention disclosed herein and patent granted therefor are hereby dedicated and granted to the free use of the people in the territory of the United States.

The present invention relates to transducers for measuring pressure waves. More specifically, it relates to a transducer for measuring peak pressures of shock fronts which employs materials whose molecules are characterized by having a permanent dipole moment as the shock sensitive element.

Transducers employing the reaction of permanent dipole moment materials to measure pressure waves, hereinafter called "polarization transducers" are presently known in the art. Such a device is described in the paper, R. J. Eichelberger and G. E. Hauver, Solid State Transducers for Recording of Intense Pressure Pulses, Les Ondes de Détonation, Colloques Internationaux du Centre National de la Recherche Scientifique published by Editions du Centre National de la Recherche Scientifique 15, Quai Anatole-France-Paris, 1961, pp. 1–22. The transducers disclosed therein are adapted to measure shock wave pulses ranging in pressure from 20 to 200 kilobars and having a rise time in the low nanosecond region. These known polarization transducers all have a planar construction. These planar constructed transducers are characterized in that variations in the relative direction of propagation of the pressure wave being measured causes significant variations in the output response of the transducer. The reason for this variation will be set forth hereinbelow in conjunction with an explanation of the theory of operation of polarization transducers.

The transducers of the present invention is characterized by an approximate convexyl protruded construction of the permanent dipole moment material which renders the transducer response significantly less dependent upon the relative orientation of the transducer and a vector normal to the shock front incident thereon than heretofore possible. This may be understood by appreciating that the shape of a polarization transducer partially controls its response to an impinging pressure wave. If the geometric configuration of the permanent dipole moment material of the transducer presented to an impinging pressure wave varies as the pressure wave encounters the transducer from different directions, the response of the transducer to the pressure wave will vary. Therefore by constructing the permanent dipole moment material of the transducer to have a convexyl protruding face in directions facing the possible sources of pressure wave propagation, that portion of the polarization transducer presented to the pressure wave is, over a wide solid angle, substantially independent of transducer orientation. Hence, it follows that the response of such a transducer is substantially less dependent upon orientation than prior art planar polarization transducers noted supra. With the polarization transducer of the present invention, it is no longer necessary to meticulously predetermine the direction of propagation of the pressure wave and then precisely align the transducer with respect to this direction in order to obtain tolerable accuracy of measurement. The non-critical orientation feature of the present polarization transducer now permits, in many instances, relatively rapid, inexpensive pressure wave test set ups.

For example, a coaxial cylindrically constructed transducer would be independent of the direction of propagation along any path which intercepts the cylindrical transducer generally normal to its cylindrical surface. In other words, the direction of propagation can be along any path which lies in a plane which is generally perpendicularly transverse to the principal axis of the cylinder without affecting the response of the transducer to the impinging pressure wave. Similarly, in the case of a transducer in the form of a paraboloid, the direction of propagation of a pressure wave could deviate over a substantial solid angle about the axis of the paraboloid without materially altering the response of the transducer. As noted supra, the transducer configuration must present to a pressure wave impinging its surface a "convexly protruding face." A transducer configuration in the form of intersecting planes, e.g., dihedrons, polyhedrons, with acute included angles between the planes is considered herein to be a transducer with a "convexly protruding face."

Additionally, transducer configurations which present a "generally uniformly curved" surface to an impinging pressure wave includes a special class of polyhedrons. Such polyhedrons are regular polyhedrons with included angles between the regular planar surfaces between 170° and approaching 180°.

At this point, a better understanding of the present invention and of the concept of a dipole moment may be gained by considering the following postulated theory of operation of polarization transducers. As noted above, these polarization transducers employ material having permanent dipole moments under the conditions of use. The basic mechanism is reported by Eichelberger and Hauver supra to consist of a shock-induced rotation of a molecule having a permanent dipole moment. For the sake of simplicity, the molecule may be treated as a dumbbell having unequal masses, but equal charges of opposite sign, at its extremities. Under ambient conditions, the molecules are locked into a randomly arrested condition, resulting in no electrical potential difference between different surfaces of dielectric material. The passage of a pressure pulse imparts sufficient energy to the molecules to permit them to rotate. The unequal spatial distribution of mass in each molecule tends to cause it to become oriented in a particular direction with respect to a vector normal to the shock front. Immediately behind the shock front, therefore, molecules are no longer randomly oriented, but all tend to point in a certain direction. Because each molecule behaves as a static electric dipole, and because these dipoles are substantially aligned, the material behind the shock front becomes electrically polarized.

The alignment of the dipoles induces electric charges on those surfaces of the dielectric whose normal vectors have a nonzero component along the direction of shock wave travel. The polarity of a given surface charge depends on whether the aforementioned normal vector component is directed in the same direction that the shock travels or in the opposite direction. Thus, if a surface on one side of the dielectric specimen acquires a positive electrical charge, the opposite surface will acquire a negative electrical charge. The charge difference between two surfaces can be detected and recorded by means of an electrically conducting electrode placed in contact with each surface, the electrodes being connected to an electronic measuring and recording apparatus.

Before proceeding further, it may be well to note that further features of the polarization transducer are ruggedness and ease of assembly (in the case of the spherical transducer once the basic sphere is manufactured), and simplicity of structure.

Accordingly, one major object of the present invention is to provide a polarization transducer which is relatively insensitive to direction orientation.

A further object of the present invention is to provide a polarization transducer which lends itself to rapid inexpensive installation in test set-ups.

Still another object of this invention is to provide a transducer which can accurately measure the maximum pressure associated with steeply rising shock fronts.

A further object of this invention is to provide a method for detecting the magnitude of shock waves, which method provides an accuracy of measurement that is relatively independent of orientation at the sensing element.

These and other objects of the present invention will become more apparent in light of the following description taken with the accompanying drawing.

The single figure depicts a spherical embodiment of the polarization transducer of the present invention.

In brief the transducer of the present invention comprises a dielectric material, whose molecules exhibit a permanent dipole moment, having a generally convex face protruding in the direction facing the possible sources of pressure wave propagation. A first electrical conductive member is juxtaposed the convex face of the dielectric material. A second electrical conductive member is juxtaposed the face of the dielectric material distal to the convex face and insulated from the first conductive member. In an improved construction conductive members are disposed in nested relation with the respective faces of the dielectric material, i.e., with a first electrical conductive member disposed with one surface in nested covering relation with a first surface of the dielectric material. A second electrical conductive member is disposed with one surface in nested covering relation to the surface opposite the first surface of the dielectric material to provide a laminar form. An even more superior configuration is that of a spherically constructed polarization transducer. The spherical polarization transducer includes two concentrically spaced substantially spherical electrically conductive members in which the sphericity of the conductive members is interrupted only by an electrical terminal means and in which a permanent dipole moment dielectric material is disposed in laminar relation in the space between the conductive members.

In the figure, the most preferred embodiment of the polarization transducer 11 is comprised of a substantially spherical dielectric shell 12, formed, e.g., of a material having molecules with a permanent dipole moment, i.e., a polarized dielectric resin or plastic material such as polymethyl methacrylate resin known commonly as Lucite or Plexiglas. Other plastics having polar groups and low electrical conductivity as well as, perhaps, polar-ceramic-dielectrics or composites should behave similarly. A first spherical conducting shell 13 is disposed concentrically within and contiguous with dielectric shell 12. A second conducting shell 14, defining a spherical interior region, is disposed concentrically without, contiguous to shell 12 in insulated relation. In preferred practice, silver coatings on the dielectric material shell form the two conducting shells 13 and 14 respectively. In practice the spherical dielectric shell 12 of the transducer 11 has been machined from dielectric resin with the inside diameter being e.g., two inches with a thirty thousandths inch shell thickness. Dielectric shell 12 has a cylindrical neck 16 with a flared end 17 machined to mate with spherical portion of the transducer 11. Vapor plating, chemical or electrodeposition processes or foil fabrication procedures can be used to provide the conductive shell members.

In use an electrical signal measuring and recording device 18, which may be a high speed, high input impedance oscilloscope, is connected by a first conducting lead 19 to outer shell 14 and a second conducting lead 21 is electrically connected to inner shell 13. The above-mentioned cylindrical neck is ideally adapted to receive a coaxial connector 22, leads 19 and 21 then being parts of a coaxial cable or other appropriate high frequency transmission system. However, to more simply connect the inner shell 13 and outer shell 14 to conducting leads 21 and 19 respectively, two conducting strips, 23 and 24, extend from the inner and outer portions of the coaxial connector respectively to electrically connect with shells 13 and 14 respectively. Note that the transmission system for carrying electrical signals from the transducer proper to measuring device 16 must be appropriate to handle the generated signals without intolerably degrading the rise time of the signal to a point where the analog data becomes worthless.

In operation, transducer 11 may be disposed, for example, to intercept an intense, steeply rising planar pressure wave front. As previously explained, this pressure wave, as it traverses dielectric 12, causes the dipole molecules to rotate, thereby inducing opposite charges on conducting shells 13 and 14. The maximum magnitude of this induced charge closely follows the maximum magnitude of the pressure immediately behind the shock front of the exciting pressure pulse. Measuring device 18, being in electrical communication with this induced charge, by way of leads 19 and 21, records the amplitude of the charge as a function of time.

The transducer of the preferred embodiment described above has been operated successfully to detect shock wave pulses having pressures ranging from 45 to 180 kilobars. It has been found that by surrounding the transducer with a material for suitably mismatching the shock impedance, the effective range of this instrument can be substantially extended in either direction. In the paper "Shock-Induced Polarization of Plexiglas and Polystyrene" at page 21 of Ballistics Research Laboratories Report No. 1258, August 1964, Ballistics Research Laboratories, Aberdeen Proving Grounds, Maryland, Allison and Hauver also indicate that this polarization response occurs at pressures well below 45 kilobars but very sensitive equipment is necessary to detect it. In effect then the useful range of this invention is almost unlimited and certainly extends from less than one kilobar to perhaps one megabar.

While elements 12, 13 and 14 have been recited as spherical shells, the only necessary limitation for optimum direction insensitivity is that element 12 be a generally spherical shell or spherical shell segment and that the faces of elements 13 and 14 adjacent element 12 have conforming surfaces. The general body shape of elements 13 and 14 may be any shape. For example, element 13 may be a solid sphere entirely filling shell 12 and element 14 may be a square block having spherically hollow center. However, the structure described above is convenient for fabrication by standard techniques.

Before concluding this description, it may be well to note that dielectric shell 12 may comprise any dielectric material having a permanent dipole moment under the conditions of use. Examples of such material are Plexiglas, nylon, polystyrene, and even distilled water. In those cases where a liquid dielectric is used, a suitable liquid container would be laminated between inner and outer conductive shells 13 and 14.

Although the preceding discussion has been limited to a spherical construction, as noted hereinbefore, many deviations from a planar construction will reduce the direction sensitivity of a polarization transducer, e.g., paraboloidal, regular polyhedral, ellipsoidal and intersecting planes.

Although the present invention has been shown and described with reference to a particular embodiment, nevertheless various changes and modifications obvious to one skilled in the art are within the spirit, scope and contemplation of the present invention and it is intended to cover all such as fall within the scope of the appended following claims.

What is claimed is:
1. In a transducer for measuring intense pressure waves, the combination comprising:
   (a) a substantially spherical dielectric material shell, said shell comprised of a dielectric material whose molecules have a permanent dipole moment;
   (b) a first electrically conducting body disposed within said dielectric shell, said first body having an outer surface conforming to and juxtaposed said dielectric shell, said first conducting body having a terminal attached thereto, and
   (c) a second electrically conducting body disposed outside said dielectric shell, said second body defining an inner cavity, the boundary of said inner cavity conforming to and juxtaposed said dielectric shell, said second conducting body having a terminal attached thereto.

2. A transducer as defined in claim 1 wherein said dielectric shell material is selected from the group of materials consisting of Plexiglas, nylon, polystyrene, and distilled water.

3. In a transducer for observing the steep shock front of a pressure wave, the combination comprising:
   (a) a substantially spherical dielectric shell, said dielectric shell being comprised of a dielectric material having a permanent dipole moment;
   (b) a first spherical electrically-conductive shell concentrically disposed within and juxtaposed said dielectric shell;
   (c) a second spherical electrically-conductive shell concentrically disposed outside and juxtaposed said dielectric shell, and
   (d) terminal means attached to said shells for connecting said shells to an electrical signal measuring device.

4. A transducer as defined in claim 3 further defined by said first and second conducting shells each being a layer of electrically conducting material coated, respectively, on the inner and outer surfaces of said dielectric shell.

5. In a sensing device for observing intense pressure pulses in a manner relatively independent of the orientation of said sensing device with respect to the direction of propagation of said pressure pulse, the combination comprising:
   (a) a spherical dielectric shell, said shell comprising a dielectric material having a substantially permanent dipole moment;
   (b) a first spherical electrically-conductive shell concentrically disposed contiguously within said dielectric shell;
   (c) a second spherical electrically-conductive shell concentrically disposed contiguously without said dielectric shell; and
   (d) an electrical-impulse responsive device electrically connected across the two conducting shells to detect any electrical pulse generated across said shells in response to a pressure wave impinging on said dielectric shell.

6. In a pressure transducer for measuring the steep shock front of a transient pressure pulse, the combination comprising:
   (a) a spherical methylmethacrylate resin shell;
   (b) a first spherical silver shell coated on the inner surface of said dielectric shell;
   (c) a second spherical silver shell coated on the outer surface of said dielectric shell; and
   (d) terminal means connected to said first and second silver shells to electrically connect an electrical impulse responsive device across said first and said second silver shells.

References Cited
UNITED STATES PATENTS

| | | | |
|---|---|---|---|
| 2,548,947 | 4/1951 | Clewell | 73—35 |
| 2,808,524 | 10/1957 | Feinstein | 73—517 X |
| 2,939,970 | 6/1960 | Dranetz et al. | 310—8.7 |
| 3,024,641 | 3/1962 | Fix | 73—35 |
| 3,104,336 | 9/1963 | Harris | 310—8.8 |

JAMES J. GILL, Primary Examiner.